United States Patent [19]
Scott

[11] 3,803,728
[45] Apr. 16, 1974

[54] AUDIO VISUAL EDUCATIONAL DEVICE

[76] Inventor: William Wayne Scott, 300 Laurel Rd., Easley, S.C. 29640

[22] Filed: June 6, 1973

[21] Appl. No.: 367,637

[52] U.S. Cl. .................................. 35/8 A, 40/28.3
[51] Int. Cl. ............................................ G09b 5/06
[58] Field of Search .............. 35/8 A, 35 C; 40/28.1, 40/28.3

[56] References Cited
UNITED STATES PATENTS

| | | |
|---|---|---|
| 3,222,597 | 12/1965 | Beatenbough et al. ............ 35/8 A X |
| 3,245,156 | 4/1966 | De Bloois et al. ...................... 35/8 A |
| 3,481,052 | 12/1969 | Dorsett .................................... 35/8 A |
| 3,540,132 | 11/1970 | Glass et al. ............................. 35/8 A |
| 3,738,021 | 6/1973 | Hino et al. .............................. 35/8 A |

*Primary Examiner*—Wm. H. Grieb
*Attorney, Agent, or Firm*—Bailey & Dority

[57] ABSTRACT

An educational device for co-ordinating printed information on a chart with an audio recording. The device includes a rigid transparent board upon which a chart is placed. Spring biased electrically conductive members engage a piece of conductive taper carried on the chart to close a circuit for turning on a tape recorder. When the chart is removed from the rigid board the recorder is turned off. The rigid board and chart are transparent so that the printed information carried thereon can be projected onto a screen by a conventional projector.

4 Claims, 2 Drawing Figures

PATENTED APR 16 1974　　　　　　　　　　　　　　3,803,728

AUDIO VISUAL EDUCATIONAL DEVICE

BACKGROUND OF THE INVENTION

This invention relates to an educational device, and more particularly to an educational device which co-ordinates printed information on a chart with the operation of an audio recording, such as a cassette used in a tape recorder.

Frequently, when an instructor is presenting a lecture to a class he utilizes charts mounted on a transparent sheet so that the printed material can be projected onto a screen by means of a conventional overhead projector. These projectors only require that the sheet upon which the printed material is carried be positioned on the deck thereof so that light can along with the charts.

Frequently, as a result of absenteeism students will miss certain lectures requiring either a makeup lecture or a loss of material presented on the day of absence.

SUMMARY OF THE INVENTION

One of the primary purposes of the subject invention is to provide a device wherein, students who have missed a lecture can at a later time convenient to them utilize the charts presented by the lecturer, as well as a recording of the lecture to recoup the information that was missed.

A system constructed in accordance with the present invention enables the students to utilize the educational device for co-ordinating printed information on charts and the like, with an audio presentation. The system includes a chart having a firm, stiff paperboard border extending around, providing a frame for a relatively thin transparent sheet. Printed on the chart by any conventional means, such as grease pencil, is information, such as graphs, used by the lecturer in presenting his lecture. An electrically conductive member in the form of a piece of tape is positioned adjacent the top border of the chart. The chart is adapted to be placed on a rigid transparent planar member which has an overlying ledge carried adjacent the upper portion thereof, which is spaced from the main surface so as to define a groove therebetween. A pair of laterally spaced electrically conductive resilient members are disposed in the groove for engaging the electrically conductive tape for turning on the tape recorder when the chart is positioned on the rigid member.

Accordingly, it is an important object of the present invention to provide an educational device for co-ordinating printed information carried on charts and the like, with an audio recording.

Another important object of the present invention is to provide a very simple and relatively inexpensive educational device which co-ordinates audio material with visual printed information.

Still another important object of the present invention is to provide an educational device, which includes transparent charts that automatically turn on a sound reproducing device upon inserting such into a chart holding device for co-ordinating the chart with a tape recorder.

These and other objects and advantages of the invention will become more apparent upon reference to the following specification, attendant claims and drawing.

DESCRIPTION OF THE PREFERRED EMBODIMENT

Figure 1:
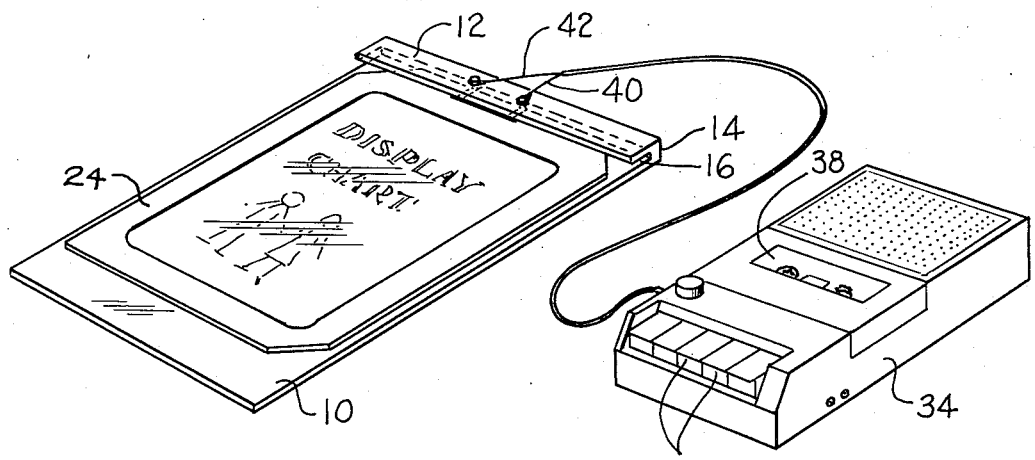
FIG. 1 is a perspective view illustrating an educational device for co-ordinating printed information with an audio tape recorder constructed in accordance with the present invention.
Figure 2:
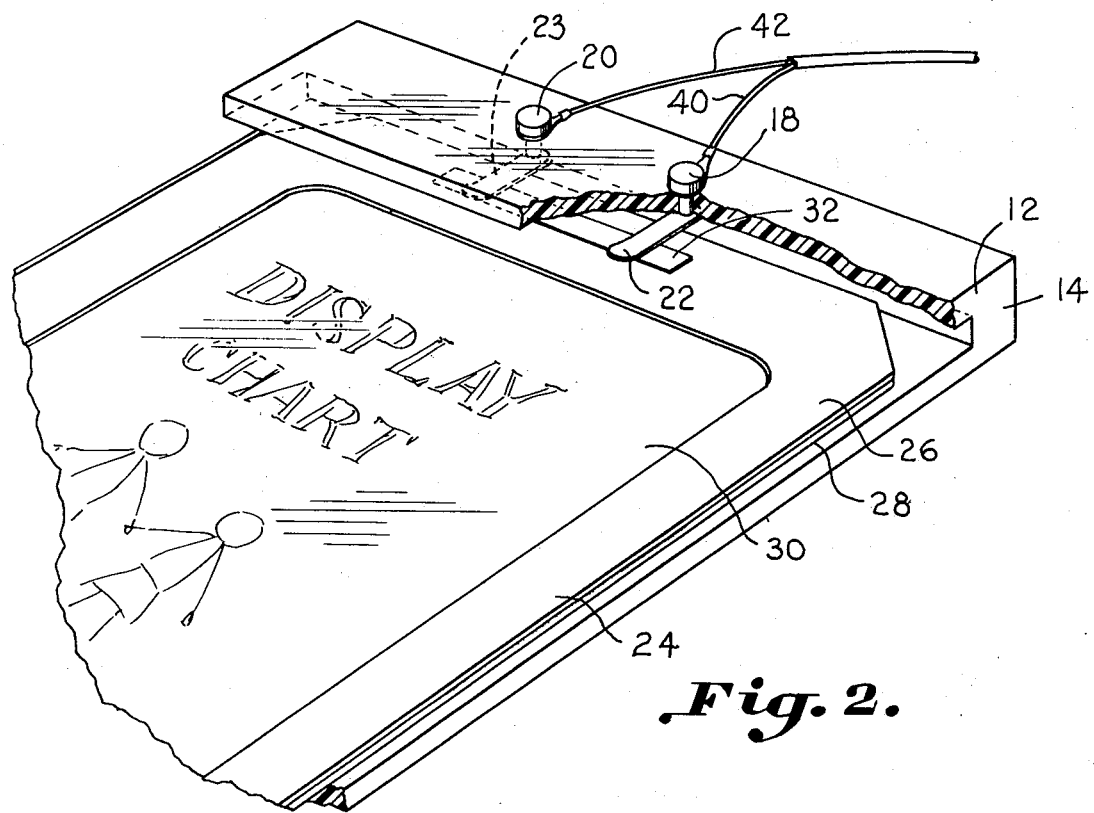
FIG. 2 is an enlarged fragmentary perspective view with parts removed, for purposes of clarity illustrating the chart supporting mechanism.

Referring in more detail to FIG. 1 of the drawing, there is illustrated a chart supporting mechanism 10 that is constructed of any suitable material, such as plexiglass. The chart supporting device 10 is rectangular, and has a planar main surface. Integral with an upper end of the main surface is an overlying ledge 12 which is joined to the main body 10 by a vertical flange 14. The inner end of the overlying ledge 12 is spaced above the upper end of the main planar surface so as to define a groove 16 therebetween. A pair of electrical contacts 18 and 20 extend through the ledge 12 and each has a resilient electrically conductive contact arms 22 and 23 connected by any suitable means to the lower end thereof. The inner ends of the contact arms 22 and 23 are curved upwardly.

A chart 24 upon which printed information is carried is provided for completing a circuit between the two conductive elements 22 and 23. The chart includes upper and lower rectangular framing members 26 and 28 constructed of any suitable paperboard material. The framing members 26 and 28 have a rectangular opening provided in the center thereof for accommodating a sheet of any suitable transparent plastic material 30. The plastic material 30 should have enough body so as to permit printing information thereon by any suitable means, such as a grease pencil, printers ink, or paint. The framing members 26 and 28 may be secured together by any suitable means, such as adhesive, for securing the transparent sheet 30 rigidly therebetween.

Positioned adjacent the top portion of the framing member 26 is an electrically conductive strip 32 constructed of any suitable material, such as copper. This strip 32 has sufficient length to more than span the space between the space contacts 22 and 23. Such is to close the circuit between the contacts 22 and 23 when the chart 24 is inserted thereunder for co-ordinating the printed information on the chart with the audio information recorded on a recorder 34.

The recorder 34 may be any suitable conventional cassette recorder having the standard control buttons 36 provided on the front thereof. The magnetic tape 38 upon which the audio information is stored is placed in the recorder so that when the recorder is turned on such will reproduce the sound carried thereon.

Normally, when preparing the recording it is desirable that the lecturer give instruction to change the charts. When the person operating the educational device hears this audio instruction he removes the chart 24 from the chart holding device. As the chart is withdrawn from under the contact arms 22 and 23 it opens the circuit turning the tape recorder off. It is noted that the contact arms 22 and 23 are connected by means of contacts 18 and 20 and wires 40 and 42 to a conventional "On-Off" mechanism associated with the recorder. The recorder, of course, may be either a battery operated recorder and player, or it may be operated off 115 volt A.C. The educational device can also, be utilized with a conventional overhead projector for displaying the information printed on the chart 24. This is the reason for making the rigid planar surface of the chart holder 10 out of transparent plexiglass.

While a preferred embodiment of the invention has been described using specific terms, such description is for illustrative purposes only, and it is to be understood that changes and variations may be made without departing from the spirit or scope of the following claims.

What is claimed is:

1. An educational device for co-ordinating printed information with an audio recording comprising:
    a chart having a border portion adjacent at least the top thereof, said printed information being carried on said chart,
    an electrically conductive member carried on said border portion adjacent said top portion of said chart,
    a rigid member having a planar main surface for supporting said chart,
    an overlying ledge carried adjacent an upper portion of said rigid member being spaced therefrom to define a groove,
    a pair of spaced electrically conductive members disposed in said groove for engaging said electrically conductive member carried on said chart when said chart is positioned on said rigid member with said top portion of said chart inserted in said groove,
    an electrically operated audio reproducing device having audio information stored thereon related to said information carried on said chart, and
    means for activating said audio reproducing device for reproducing said audio information stored thereon when said electrically conductive member on said chart engages said pair of spaced electrically conductive members,
    whereby the reproducing of said audio information is controlled by the insertion of a chart onto said rigid member permitting said conductive member carried thereon to engage said pair of spaced conductive members.

2. The educational device as set forth in claim 1, wherein said chart has a main body portion constructed of transparent material, and
    said printed information being located on said transparent main body portion.

3. The educational device as set forth in claim 2, wherein said rigid member is constructed of transparent material so that light can pass therethrough for projecting said printed information on said chart onto a screen.

4. The educational device as set forth in claim 1, wherein said electrically conductive member carried on said border portion is electrically conductive tape.

* * * * *